Patented Aug. 20, 1929.

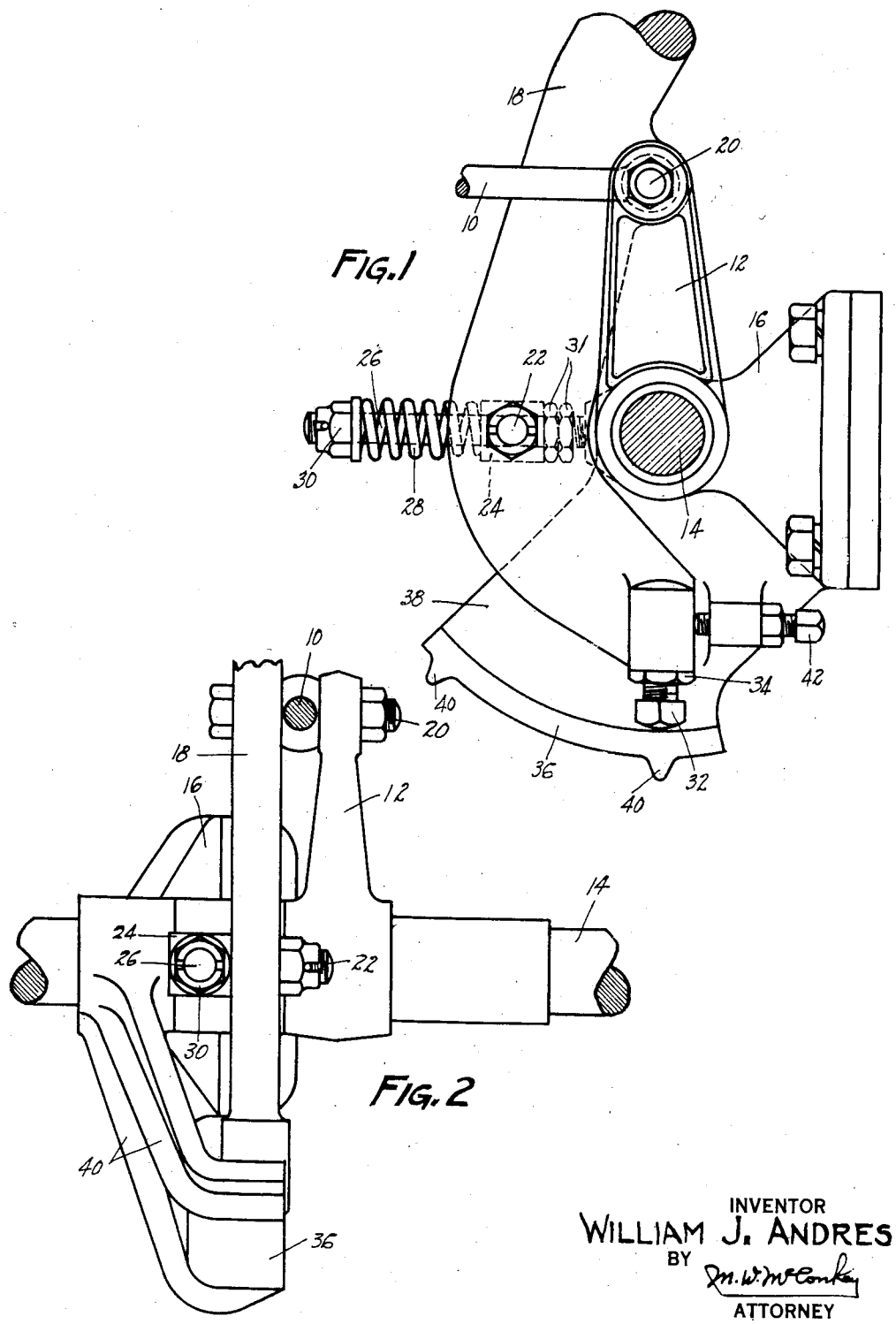

1,724,897

UNITED STATES PATENT OFFICE.

WILLIAM JOSEPH ANDRES, OF SOUTH BEND, INDIANA.

LEVER MOVEMENT.

Application filed October 12, 1925. Serial No. 61,993.

The invention relates to operating mechanism of the type used in applying brakes and the like, and is illustrated as embodied in an automobile brake pedal. An object of the invention is to vary the leverage of the pedal or its equivalent, when a predetermined pressure has been applied to the brakes, instead of at a predetermined point in the stroke of the pedal as in prior arrangements. This permits taking up the lost motion in the connections quickly, and then applying a heavy pressure to the brakes, without any accurate adjustment, the shift in leverage being caused automatically by the increased reaction on the pedal.

In one desirable arrangement, the pedal or equivalent lever is pivoted to the end of an arm, shown mounted on the clutch shaft, and extends past that shaft. A spring constrains the lever to turn with the arm, and when the reaction overcomes the spring, and the lever swings about the end of the arm, a part at the end of the lever engages and fulcrums on a ledge curving about the axis of the shaft, thus changing the leverage regardless of the position of the lever in its stroke.

These and other novel and desirable features of the invention will be apparent from the following description of one illustrative embodiment shown in the accompanying drawing, in which:

Figure 1 is a partial side elevation of the pedal and associated parts, with the clutch shaft in vertical section; and Figure 2 is a rear elevation of the parts shown in Figure 1.

In the illustrated arrangement, the brakes or the like are applied by a connection including a brake rod 10 and an arm 12 swinging freely about the clutch shaft 14, which is carried by a suitable bracket 16. The lever is in this instance the service brake pedal 18, pivoted to the end of arm 12 by a bolt 20 which passes through an eye in the end of rod 10, thus serving also as the means for pivoting the rod to the arm.

Lever 18 continues past shaft 14, curving rearwardly to clear it, and has a bolt 22 pivoting on its side a block 24 sleeved on the stem of an eye member 26 having its eye end embracing shaft 14. A spring 28 is sleeved on the stem 26 and confined between block 24 and a locknut 30 on the end of stem 26. This spring constrains lever 18 to turn with arm 12, and when the reaction from the brakes reaches a predetermined value, spring 28 yields and permits lever 18 to swing about the axis of bolt 20 at the end of arm 12. The relative angular positions of lever 18 and arm 12 are adjustably determined by locknuts 31, against which block 24 is urged by spring 28, while the tension of spring 28 is adjusted by the locknut 30.

At its end, lever 18 carries an adjustable setscrew 32, locked by a nut 34, which is idle as long as lever 18 and arm 12 swing together about shaft 14 as a fulcrum. As soon as spring 28 yields, however, setscrew 32 or an equivalent part engages wedgingly and fulcrums on a ledge 36 formed on a web 38 forming part of bracket 16, and shown with strengthening ribs 40. Ledge 36 curves cylindrically about shaft 14, and as lever 18 is at this time swinging about bolt 20, the path of setscrew 32 intersects ledge 36, thus shifting the fulcrum of the lever automatically from shaft 14 to ledge 36, regardless of the position of lever 18 in its stroke, and changing the effective lever arm by the radial distance 14—36.

The idle position of lever 18 may be determined by an adjustable stop such as a setscrew 42 threaded through a lug formed on web 38.

While one illustrative embodiment has been described in detail, it is not my intention to limit the scope of the invention to that particular embodiment, or otherwise than by the terms of the appended claims.

I claim:

1. A lever movement for brakes and the like comprising, in combination, an operating arm having a fixed leverage, an adjacent lever arranged to actuate the arm, and means for automatically shifting the fulcrum of the lever further along the lever from said arm and in the same direction to vary its leverage when the reaction on the arm reaches a predetermined value.

2. A lever movement for brakes and the like comprising, in combination, an operating arm having a fixed leverage, an adjacent lever coupled with the arm to actuate the same about its fulcrum point, and yieldingly connected with the arm to swing with the arm about its fulcrum point, said lever extending along the arm beyond its pivoted end, and a part adapted to be engaged by that end of the lever which projects beyond the pivoted end of the arm to serve as a fulcrum therefor when the reaction to the pivotal movement of the lever about its fulcrum reaches a predetermined value.

3. A lever movement for brakes and the like comprising, in combination, an operating arm having a fixed leverage, an adjacent lever coupled with the arm to actuate the same about its fulcrum point and yieldingly connected with the arm to swing with the arm about its fulcrum point, said lever being of a greater length than the arm and extending linearly therealong beyond both ends of the arm, and a part adapted to be engaged by one end of the lever beyond the end of the arm to serve as a fulcrum for the lever when the reaction to the pivotal movement of the arm reaches a determined value.

4. A lever movement for brakes and the like comprising, in combination, an operating arm having a fixed leverage, an adjacent lever arranged to actuate the arm, said lever pivoted to the free end of the arm and extending linearly thereof beyond both ends of the arm, means constraining the lever to pivot as one piece with the arm about the fulcrum point of the arm yieldable when the reaction to the pivotal movement of the arm reaches a determined value to pivot with respect thereto, and a stationary part adapted to be engaged by that end of the lever which extends beyond the pivoted end of the arm when the lever pivots with respect to the arm to establish a second fulcrum point for the lever.

5. A lever movement for brakes and the like comprising, in combination, an operating arm, an adjacent lever arranged to actuate the arm, and means automatically acting when the reaction on said arm reaches a predetermined value, and regardless of the position of the lever in its stroke, to shift the fulcrum of the lever along the lever on the same side of the arm to vary its effective lever arm.

6. A lever movement for brakes and the like comprising, in combination, an operating connection including an arm, mounted upon a fixed pivot, an adjacent lever extending along the arm and arranged to actuate the connection, and means automatically acting when the reaction on said connection reaches a predetermined value, and regardless of the position of the lever in its stroke, to vary the effective lever arm of said lever.

7. A lever movement for brakes and the like comprising, in combination, an operating connection including an arm, an adjacent lever pivoted to the arm and arranged to actuate the connection, and means automatically acting when the reaction on said connection reaches a predetermined value, and regardless of the position of the lever in its stroke, to change the fulcrum of the lever.

8. A lever movement for brakes and the like comprising, in combination, an operating arm, an adjacent lever arranged to actuate the arm, and means automatically acting when the reaction on said arm reaches a predetermined value, and regardless of the position of the lever in its stroke, to change the fulcrum of the lever, together with means for changing said predetermined value and a stationary part adapted to serve as the fulcrum of the lever upon said change in the fulcrum point thereof.

9. A lever movement for brakes and the like comprising, in combination, an operating arm, a lever having two fulcrums and arranged to actuate the arm, a spring urging the lever and arm to move together, and means operated by the yielding of the spring to shift the lever from one fulcrum to the other.

10. A lever movement for brakes and the like comprising, in combination, an operating connection including a pivoted arm, an adjacent lever, a spring urging the lever to turn with the arm about a first fulcrum and yielding on movement of the lever when the reaction on the connection prevents its further movement, and a part engaged by movement of the lever independently of the arm when the spring yields and which constitutes a second fulcrum for the lever.

11. A lever movement for brakes and the like comprising, in combination, an operating connection including a pivoted arm, an adjacent lever, a spring urging the lever to turn with the arm about a first fulcrum and yielding on movement of the lever when the reaction on the connection prevents its further movement, and a part engaged by movement of the lever independently of the arm when the spring yields and which constitutes a second fulcrum for the lever spaced from the first fulcrum in a direction to vary the effective lever arm.

12. A lever movement for brakes and the like comprising, in combination, an operating connection including a pivoted arm, an adjacent lever, a spring urging the lever to turn with the arm about a first fulcrum and yielding on movement of the lever when the reaction on the connection prevents its further movement, a part engaged by movement of the lever independently of the arm when the spring yields and which constitutes a second fulcrum for the lever, and means for adjusting the tension of the spring.

13. A lever movement for brakes and the like comprising, in combination, a shaft, an arm pivoted for movement about the shaft, a lever pivoted to the end of the arm and extending past the shaft, a spring resisting pivoting of the lever about the end of the arm and constraining the lever to turn with the arm about the shaft, and a part engaged by the lever at its end when the lever pivots about the end of the arm against the resistance of the spring and which serves as an auxiliary fulcrum for the lever.

14. A lever movement for brakes and the like comprising, in combination, a shaft, an arm pivoted for movement about the shaft, a lever pivoted to the end of the arm and extending past the shaft, a spring resisting pivoting of the lever about the end of the arm and constraining the lever to turn with the arm about the shaft, and an arcuate ledge curved about the axis of the shaft and engaged by the lever at its end when the lever pivots about the end of the arm against the resistance of the spring and which serves as an auxiliary fulcrum for the lever.

15. A lever movement for brakes and the like comprising, in combination, a shaft, an arm pivoted for movement about the shaft, a lever pivoted to the end of the arm and extending past the shaft, a spring resisting pivoting of the lever about the end of the arm and constraining the lever to turn with the arm about the shaft, and an arcuate ledge curved about the axis of the shaft and engaged by the lever at its end when the lever pivots about the end of the arm against the resistance of the spring and which serves as an auxiliary fulcrum for the lever, the lever having an adjustable part which engages said ledge.

16. A lever movement for brakes and the like comprising, in combination, a shaft, an arm pivoted for movement about the shaft, a lever pivoted to the end of the arm and extending past the shaft, a spring resisting pivoting of the lever about the end of the arm and constraining the lever to turn with the arm about the shaft, a stop against which the lever is urged by the spring, a ledge at the end of the lever curved about the axis of the shaft, and a part carried by the lever which engages and fulcrums on the ledge when the lever swings about the end of said arm against the resistance of the spring.

17. A lever movement for brakes and the like comprising, in combination, a shaft, an arm pivoted for movement about the shaft, a lever pivoted to the end of the arm and extending past the shaft, a spring resisting pivoting of the lever about the end of the arm and constraining the lever to turn with the arm about the shaft, a ledge at the end of the lever curved about the axis of the shaft, and an adjustable setscrew carried by the lever which engages and fulcrums on the ledge when the lever swings about the end of said arm against the resistance of the spring.

18. A lever movement for brakes and the like comprising, in combination, a shaft, an arm pivoted for movement about the shaft, a lever pivoted to the end of the arm and extending past the shaft, a spring resisting pivoting of the lever about the end of the arm and constraining the lever to turn with the arm about the shaft, a stop against which the lever is urged by the spring, a ledge at the end of the lever curved about the axis of the shaft, a part carried by the lever which engages and fulcrums on the ledge when the lever swings about the end of said arm against the resistance of the spring, and a stop engaged by and positioning the end of the lever in idle position.

19. A lever movement for brakes and the like comprising, in combination, a pivoted arm, a lever pivoted to the free end of the arm and extending therealong beyond both ends thereof, means constraining the lever to pivot as one piece with the arm yieldable when the reaction to the pivotal movement of the arm reaches a determined point, and a part adapted to be engaged by the end of the lever which projects beyond the end of the arm when the reaction to the pivotal movement of the arm passes a determined point to serve as a fulcrum for the lever.

20. A lever connection for brakes and the like comprising, in combination, a pivoted arm having a fixed leverage, and means for increasing such leverage including a lever pivoted at the free end of the arm, and extending therealong beyond both ends of the arm, a brake operating connection mounted upon the pivotal connection of the lever and the arm, means constraining the lever and arm to pivot as one piece yieldable to permit the lever to swing upon its pivotal connection with the arm, and means adapted to be engaged by that portion of the lever which projects beyond the pivoted end of the arm when the lever swings about its pivotal connection with the arm to serve as a fulcrum for the lever.

In testimony whereof, I have hereunto signed my name.

WILLIAM JOSEPH ANDRES.